UNITED STATES PATENT OFFICE.

JAMES MECREDY, OF LONDON, ENGLAND.

DESICCATED EGG.

SPECIFICATION forming part of Letters Patent No. 651,720, dated June 12, 1900.

Application filed May 11, 1899. Serial No. 716,432. (No specimens.)

*To all whom it may concern:*

Be it known that I, JAMES MECREDY, barrister at law, of 1 Brick Court, Temple, London, England, have invented a certain new and useful Improvement in Preserved Eggs, of which the following is a specification.

This invention relates to improvements in concentrated preserved egg, as hereinafter set forth and claimed.

The nature of my invention will be best understood by a description thereof in connection with the preferred method of manufacturing the same, as herein set forth.

According to my invention the yolks and whites of good sound eggs are mixed or blended *in vacuo* or in a vessel completely filled therewith. This mixing or blending as above prevents frothing of the egg or other injurious effect due to the presence of atmospheric air. Any suitable vessel or apparatus may be employed for this blending or mixing. While in the mixing or blending vessel I add to and thoroughly incorporate with the egg a suitable proportion of a mixture of sodium chloride and sodium phosphate, which mixture serves to preserve the egg, while merely increasing the proportion of some of the natural alkaline constituents thereof. It is preferable that not more than three-quarters of an ounce of this mixture of anhydrous salts should be added to the contents of one hundred average-sized hens' eggs, such proportion preserving the eggs from deleterious change in the subsequent stages of treatment and storage and greatly facilitating the reabsorption of water by the finally-dried product when required for use. The blended egg is then desiccated by evaporation *in vacuo* to a semifluid consistency, and this semifluid substance may then either be hermetically sealed in suitable vessels, ready for culinary or other use when required, or it may be poured onto oiled or greased paper or similar material and further desiccated in a hot-air oven or its equivalent, preferably at a temperature of about 130° Fahrenheit, until it contains not more than about twelve per cent. of moisture and assumes a solid flaky form. This solid flaky substance is then reduced to a suitable degree of granulation and packed ready for use.

Where the climate is sufficiently dry and only the solid granulated product is required, the preliminary evaporation *in vacuo* may be dispensed with and the blended egg incorporated with the mixed salts desiccated directly in the hot-air apparatus.

When required for use for culinary or other purposes, the semifluid or solid granulated egg is mixed with a suitable proportion of water, which it readily absorbs, this absorption being greatly assisted by the above-specified increase of the natural alkaline constituents of the egg. The water is added to the solid granulated material in the proportion of about two tablespoons of water to one of the substance in order to produce a liquid corresponding to the original blended egg.

I have described the whites and yolks of the egg as being mixed and treated together; but it is obvious that they may be treated separately, if required, and it will be understood that I do not herein confine myself to the process herein described, as the same is merely a preferable manner for producing my improved product.

The product resulting from the treatment described is a preserved concentrated egg containing a mixture of phosphate of sodium and chloride of sodium and has a semifluid characteristic.

What I claim is—

1. The herein-described preserved concentrated egg containing a mixture of phosphate of sodium and chloride of sodium, substantially as described.

2. The herein-described preserved evaporated concentrated egg containing a mixture of phosphate of sodium and chloride of sodium, and being semifluid, substantially as described.

In testimony whereof I have hereunto set my hand, in presence of two subscribing witnesses, this 12th day of April, 1899.

JAMES MECREDY.

Witnesses:
F. W. McLELLAN,
FRED C. HARRIS.